United States Patent
Faibish et al.

(10) Patent No.: US 10,445,289 B1
(45) Date of Patent: Oct. 15, 2019

(54) METHOD AND APPARATUS FOR AUTOMATIC CLEANUP OF DISFAVORED CONTENT

(71) Applicant: EMC IP Holding Company LLC, Hopkinton, MA (US)

(72) Inventors: Sorin Faibish, Newton, MA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 387 days.

(21) Appl. No.: 14/674,522

(22) Filed: Mar. 31, 2015

(51) Int. Cl.
*G06F 16/11* (2019.01)
*G06F 16/185* (2019.01)

(52) U.S. Cl.
CPC .......... *G06F 16/113* (2019.01); *G06F 16/125* (2019.01); *G06F 16/185* (2019.01)

(58) Field of Classification Search
CPC ............ G06F 17/30085; G06F 17/30221
USPC ......................................... 707/662
See application file for complete search history.

(56) References Cited

U.S. PATENT DOCUMENTS

| | | | |
|---|---|---|---|
| 7,680,830 B1 * | 3/2010 | Ohr ................... | G06F 17/30085 707/2 |
| 7,693,877 B1 * | 4/2010 | Zasman ................ | G06F 16/185 707/707 |
| 2005/0076041 A1 * | 4/2005 | Stakutis ............ | G06F 17/30106 707/100 |
| 2007/0157288 A1 * | 7/2007 | Lim .................... | G06F 21/6218 726/1 |
| 2007/0179990 A1 * | 8/2007 | Zimran ............. | G06F 17/30085 707/999.201 |
| 2009/0287665 A1 * | 11/2009 | Prahlad ............. | G06F 17/30442 707/3 |
| 2010/0070725 A1 * | 3/2010 | Prahlad ............... | G06F 11/1453 711/162 |
| 2011/0078112 A1 * | 3/2011 | Takata ............. | G06F 17/30156 707/622 |
| 2011/0093471 A1 * | 4/2011 | Brockway ......... | G06F 17/30616 707/747 |
| 2011/0145196 A1 * | 6/2011 | Bender ............... | G06F 11/1435 707/640 |
| 2011/0178986 A1 * | 7/2011 | Prahlad ............. | G06F 16/24575 707/640 |
| 2012/0023140 A1 * | 1/2012 | Prahlad ............... | G06F 21/6218 707/785 |
| 2012/0084524 A1 * | 4/2012 | Gokhale ........... | G06F 17/30466 711/162 |
| 2012/0150799 A1 * | 6/2012 | Matsuzawa ....... | G06F 17/30079 707/622 |
| 2012/0179656 A1 * | 7/2012 | Bunte ................. | G06F 11/1451 707/667 |
| 2014/0281514 A1 * | 9/2014 | Erofeev ............. | G06F 21/6218 713/165 |

(Continued)

*Primary Examiner* — Pierre M Vital
*Assistant Examiner* — Andrew N Ho
(74) *Attorney, Agent, or Firm* — Ryan, Mason & Lewis, LLP

(57) ABSTRACT

Example embodiments of the present invention relate to a method and an apparatus for automatic cleanup of disfavored content. The method includes scanning a storage infrastructure for content having an attribute, identifying a disfavored instance of the content having the attribute, and removing the disfavored instance of the content from circulation.

21 Claims, 6 Drawing Sheets

(56) References Cited

U.S. PATENT DOCUMENTS

2015/0172120 A1\* 6/2015 Dwarampudi ...... H04L 67/1097
709/221

\* cited by examiner

METHOD AND APPARATUS FOR AUTOMATIC CLEANUP OF DISFAVORED CONTENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

With the proliferation of the websites containing private information about private individuals it is very difficult for the search engines to only access and use dated information about an individual. There is no clear path of cleaning the web of aged data used by search engines. Moreover there are vendors that specialize in removing private information about an individual from the web for a fee yet the results of such activity are limited to web servers that allow deleting information. Moreover for regulatory purposes there is a need to archive the data that was removed and/or manage it under the control of the private user. Such outdated information can hurt the private individual for example in the case of job applications when some bad publicity, aged, unverified or illegitimate can be found on the web by search engines with no control of the user.

SUMMARY

Example embodiments of the present invention relate to a method and an apparatus for automatic cleanup of disfavored content. The method includes scanning a storage architecture for content having an attribute, identifying a disfavored instance of the content having the attribute, and removing the disfavored instance of the content from circulation.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
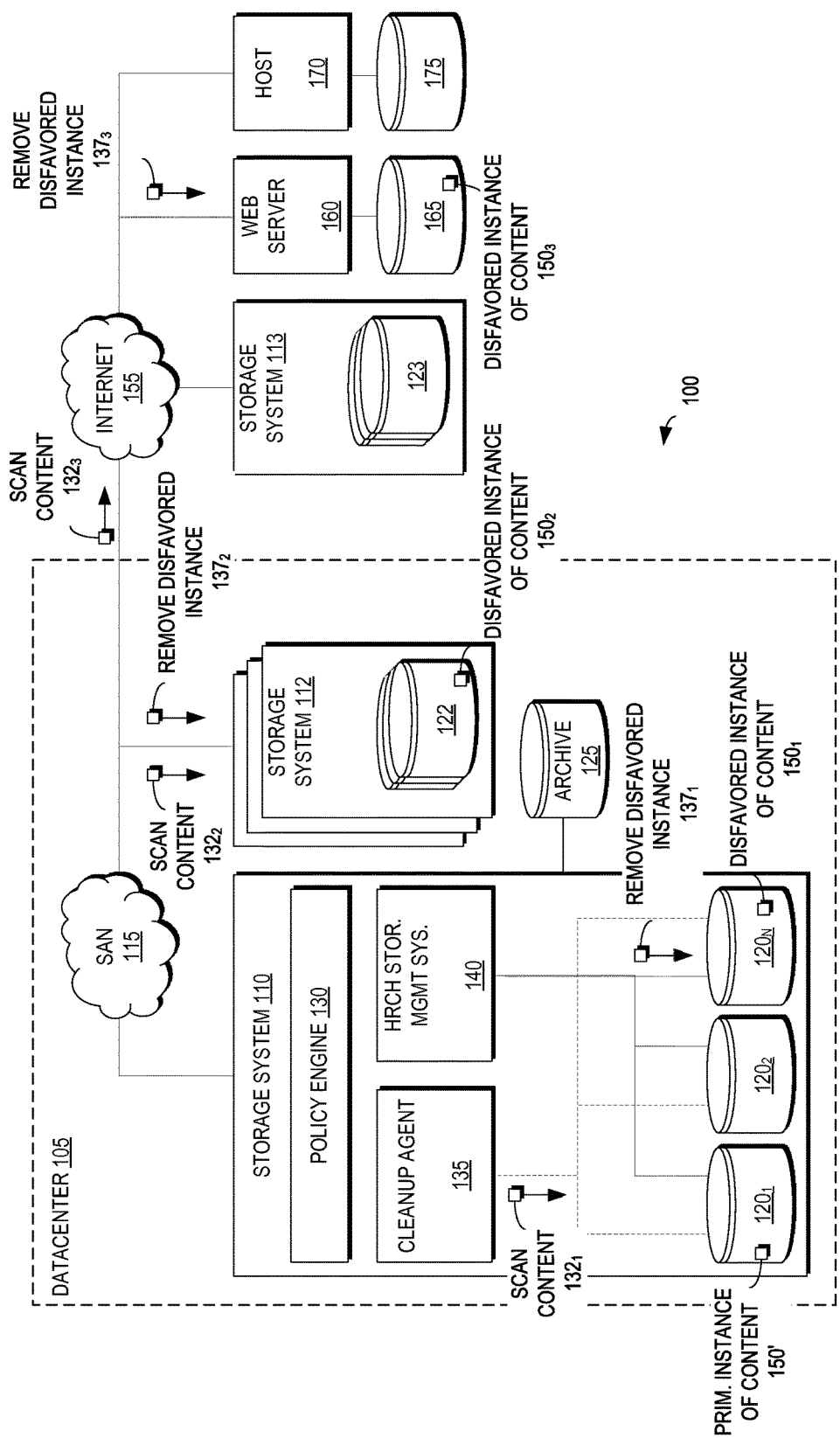
FIG. 1 is a block diagram of a storage infrastructure according to an example embodiment of the present invention.
Figure 2:
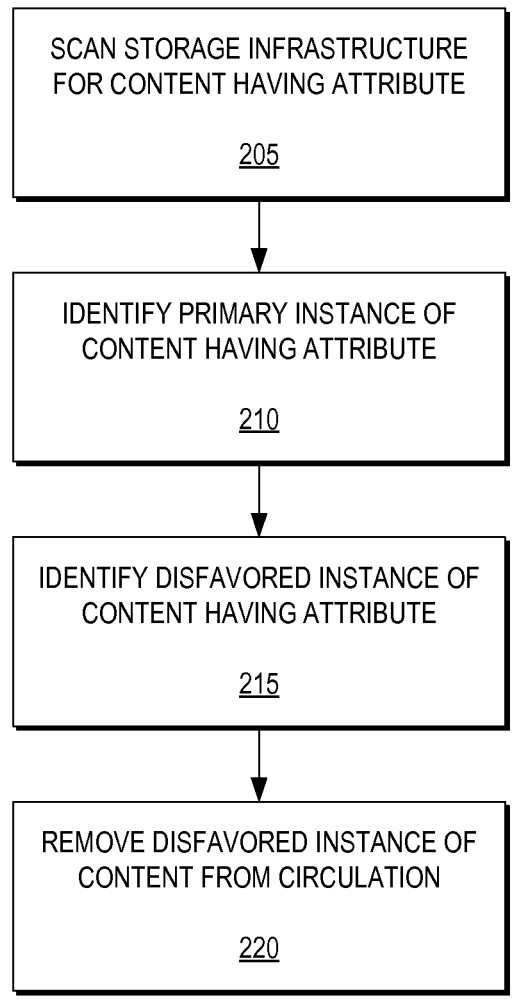
FIGS. 2-4 are flow diagrams illustrating methods according to respective example embodiments of the present invention.

Incorrect or outdated public information or content (content, generally) about an individual or organization published on the Internet, for example, can present a privacy problem for the owner of the content. Unfortunately, there is no traditional way to effectively clean such information. While some methods and services exist, it is not easy to find content in one or more networks. For example, there may not be sufficient keywords to identify the content or the content may not be indexed which, for search engines, is problematic.

Therefore, there is a need for individuals and organizations (individuals, generally) to be able to clean the Internet and other networks of disfavored content published (by both legitimate and illegitimate sources) that can hurt their respective interests. Further, there are some cases in which an individual may desire to ensure that private data (e.g., health, financial) is not discovered by search engines. Although there are companies that offer similar services, they typically achieve limited success as there is no traditional way to remove private data from the Internet such that a search engine will not be allowed to use it.

Moreover, aging data may be required to be archived for regulation or legal purposes before being deleted from the Internet. So many of the websites prefer to keep all the information at the expense of adding more storage which is cheaper than searching for old data and removing it and archiving it automatically. And, even if the content is deleted and/or moved to a lower storage tier, the content can still be accessed by search engines and pollute the individual's information accessed in the lower tier.

Example embodiments of the present invention allow a storage system to modify links of, for example, a web server related to disfavored content and remove it from the web site, archive the content, and store a stub in place of the archived content. The stub may allow subsequent access to the content for regulatory needs and search capabilities under the control of the content owner (e.g., protected by authentication). For example, example embodiments of the present invention enable storage systems, such as ViPR® and VNXe® by EMC Corporation of Hopkinton, Mass., used as back end storage for web servers, search engines, and other hosts, with the ability to delete, archive, or otherwise modify private disfavored content using special policy engines thereby preventing the search engines from finding the content.

Example embodiments of the present invention allow individuals to have better control over their content available on networks as well as to improve the data analysis to be based on updated and not outdated information. Example embodiments of the present invention may include a policy engine that controls access to a public database preserving deprecated content for, for example, archival purposes.

As will be described in greater detail below, a hierarchical storage management archiving solution may preserve disfavored instances of content, such as for regulatory purposes, under the password control of the owner of the content. Hierarchical storage management (HSM) is a data storage technique, which automatically moves data between high-cost and low-cost storage media. HSM is sometimes referred to as tiered storage. HSM systems exist because high-speed storage devices, such as hard disk drive arrays, are more expensive (per byte stored) than slower devices, such as optical discs and magnetic tape drives. While it would be ideal to have all data available on high-speed devices all the time, this is prohibitively expensive for many organizations. Instead, HSM systems store the bulk of the enterprise's data on slower devices, and then copy data to faster disk drives when needed. In effect, HSM turns the fast disk drives into caches for the slower mass storage devices. The HSM system monitors the way data is used and makes best guesses as to which data can safely be moved to slower devices and which data should stay on the fast devices.

In a typical HSM scenario, data files which are frequently used are stored on disk drives, but are eventually migrated to tape if they are not used for a certain period of time, typically a few months. If a user does reuse a file which is on tape, it is automatically moved back to disk storage. The advantage is that the total amount of stored data can be much larger than the capacity of the disk storage available, but since only rarely used files are on tape, most users will usually not notice any slowdown.

In general, HSM systems accept access to a stub and bring the data back on-line before replying to the access request. Moreover, example embodiments of the present invention allow an individual to control access to content by recovering and storing all the content from the Internet to a primary data store and controlling which search engines and services are allowed to access the content by centralizing the content and deleting it from web servers (i.e., both clandestine or and legitimate).

This will allow web servers to search normally for only content that is updated and on demand data that is off line with the users consent (i.e., if a password is provided). The search engines will be blocked to access data in the archive repository unless a special demand is formulated. Accordingly, example embodiments of the present invention may run as a service to execute a policy on the back end storage to help service providers and search engines enforce the policy and remove links to outdated content either based on policy or on user request.

For example, a private individual may need to collect all the information about him from the web in order to be sure that his private information is not outdated or at risk. Example embodiments of the present invention may offer a service that will collect all the information and delete all the other sources that can be found by search engines to only one primary location. Such an example embodiment also will allow archiving of private information and easy deletion of outdated, incorrect, or privacy-risking information and expose only updated data such that the search engines will access the updated data.

For example, a private individual may want to delete outdated information from various web sites but still preserve copies that may be accessed with password protection. Example embodiments of the present invention may allow search engines to access the deleted information or to deny such access. In certain embodiments, access may be determined by the owner of the information/content with the owner selectively granting permission. For example, the owner may grant permission to a certain category of information/content to a certain category of websites or search engines (e.g., medical information may be searched by WebMD but password protected and accessible to Google's search engine).

For example, an individual may want to remove credit card data from merchant or retailer databases (i.e., online or brick-and-mortar retailers). Example embodiments of the present invention may replace credit card data with a stub and use password protection to control access to the credit card information.

FIG. 1 is a block diagram illustrating a storage infrastructure 100 according to an example embodiment of the present invention. FIG. 1 may be described in conjunction with FIGS. 2-5 which are flow diagrams illustrating methods according to respective example embodiments of the present invention.

As illustrated in FIG. 1, the storage infrastructure 100 may include a datacenter 105 with a primary storage system 110 having a plurality of storage resources $120_1$-$120_N$ (120, generally). The datacenter 105 also may have a plurality of secondary storage systems 112 each having a plurality of respective storage resources 122. The primary storage system 110 and the secondary storage systems 112 may be communicatively coupled via a storage area network (SAN) 115. Beyond the boundaries of the datacenter 105, the storage infrastructure 100 also may include other tertiary storage systems 113 each having a plurality of respective storage resources 123 and a web server 160 and a host 170 each having respective back end storage resources 165, 175. The datacenter 105 and the tertiary storage systems 113, web server 160, and host 170 may be communicatively coupled via a network, such as the Internet 155.

The primary storage system 110 may comprise a policy engine 130, a cleanup agent 135, and a hierarchical storage management (HSM) system 140. The policy engine 130 may coordinate content operations performed by the cleanup agent 135 and the HSM system 140. In certain embodiments, each of the policy engine 130, the cleanup agent 135, and the HSM system 140 may be a virtual machine (VM) operating on the storage system 110 or a host (not shown).

The policy engine 130 may determine whether disfavored content should be deleted or stored to archive storage 125 for potential later retrieval and may control access to the archive storage 125 preserving deprecated disfavored content. For example, the policy engine may automatically delete content that exceeds a certain age and may send requests to content owners to confirm content operations. Accordingly, in example embodiments of the present invention, the policy engine 130 may run as a service to execute a policy on the storage system 110 to help individuals, service providers, and search engines enforce the policy and remove links to disfavored content either based on a policy or on a user request.

The cleanup agent 135 may scan ($132_1$, $132_2$, $132_3$) the storage infrastructure 100 (i.e., each of the storage systems 110, 112, 113 and hosts 160, 170 and their respective storage devices 120, 122, 123, 165, 175) for content having an attribute (205). In certain embodiments, the cleanup agent may identify a plurality of instances of the content 150', $150_1$, $150_2$, $150_3$. The policy engine 130 then may determine which one or more of the identified instances of the content 150', $150_1$, $150_2$, $150_3$ should be a primary instance of the content 150' and which instances of the content 150', $150_1$, $150_2$, $150_3$ should be disfavored instances of the content $150_1$, $150_2$, $150_3$.

Then, according to the determination of the policy engine 130, among the identified instances of the content 150', $150_1$, $150_2$, $150_3$ the cleanup agent 135 may identify one or more primary instances of the content having the attribute 150' (210). All other identified instances of the content $150_1$, $150_2$, $150_3$ may be identified as disfavored instances of the content having the attribute $150_1$, $150_2$, $150_3$ (150 generally) (215). As illustrated in FIG. 1, the primary instance of the content 150' is stored on the primary storage system 110 in a first storage device $120_1$. As illustrated in FIG. 1, the disfavored instances of content 150 are stored on the primary storage system 110 in an Nth storage device $120_N$, in the secondary storage system in a storage device 122, and in the backend storage 165 for the web server 160. It should be understood that the primary instance of content 150' in other embodiments may be in an storage device 120, 122, 123, 165, 175 or storage system 110, 112, 113 or host 160, 170 in the storage infrastructure 100.

Figure 3:
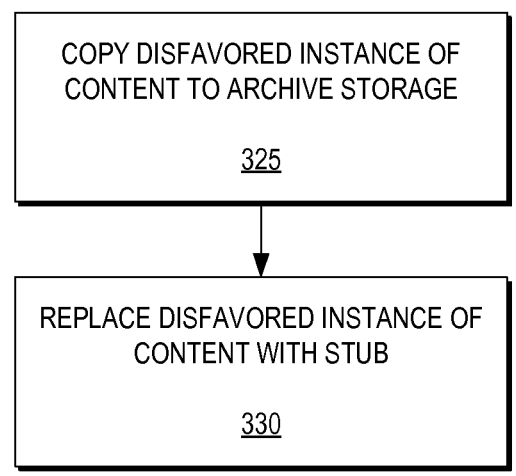

As directed by the policy engine 130, the cleanup agent 135 then may remove ($137_1$, $137_2$, $137_3$) the disfavored instances of the content 150 from circulation in the storage infrastructure 100 in favor of the primary instance of the content 150' (220). As illustrated in FIG. 3, which is a flow diagram illustrating a method according to an example embodiment of the present invention, the cleanup agent 135 may identify the disfavored instance of the content 150 to the HSM system 140 which may, in turn, copy the disfavored instance of the content 150 to archive storage 125 in the storage infrastructure 100 (325) and replace the disfavored instance of the content 150 in the HSM system 140 with a stub (330) identifying the disfavored instance of the content 150 copied to archive storage 125 in the storage infrastructure 100. In certain embodiments, the content owner may be queried to establish credentials for the content 150 copied to the archive storage 125.

For example, each time content is removed and placed in the archive 125 a stub is left in its place by the HSM system 140 (i.e., in the file system). In certain embodiments, the stub may include keywords or other metadata to enable search engines to index the stub in place of the archived content. In order to access the content 150 copied to the archive storage 125 a content movement mechanism of the HSM system 140 may bring the content 150 back from the archive storage 125. Accordingly, when the content 150 is back in file system, the stub (i.e., pointer) is removed from the file system and replaced with retrieved file. For content 150 for which the owner establishes credentials, the individual requesting access to the content 150 may be prompted for credentials during the transaction, such as before the content movement mechanism is engaged or any time thereafter.

Accordingly, the stub may replace the file or data object and will point to an archive, thereby allowing access to the archived data according to authentication. This will prevent search engines from finding the content and/or accessing archived content unless the owner grants permission provides authentication credentials (e.g., a password sent to a search engine under the condition of confidentiality).

Figure 4:
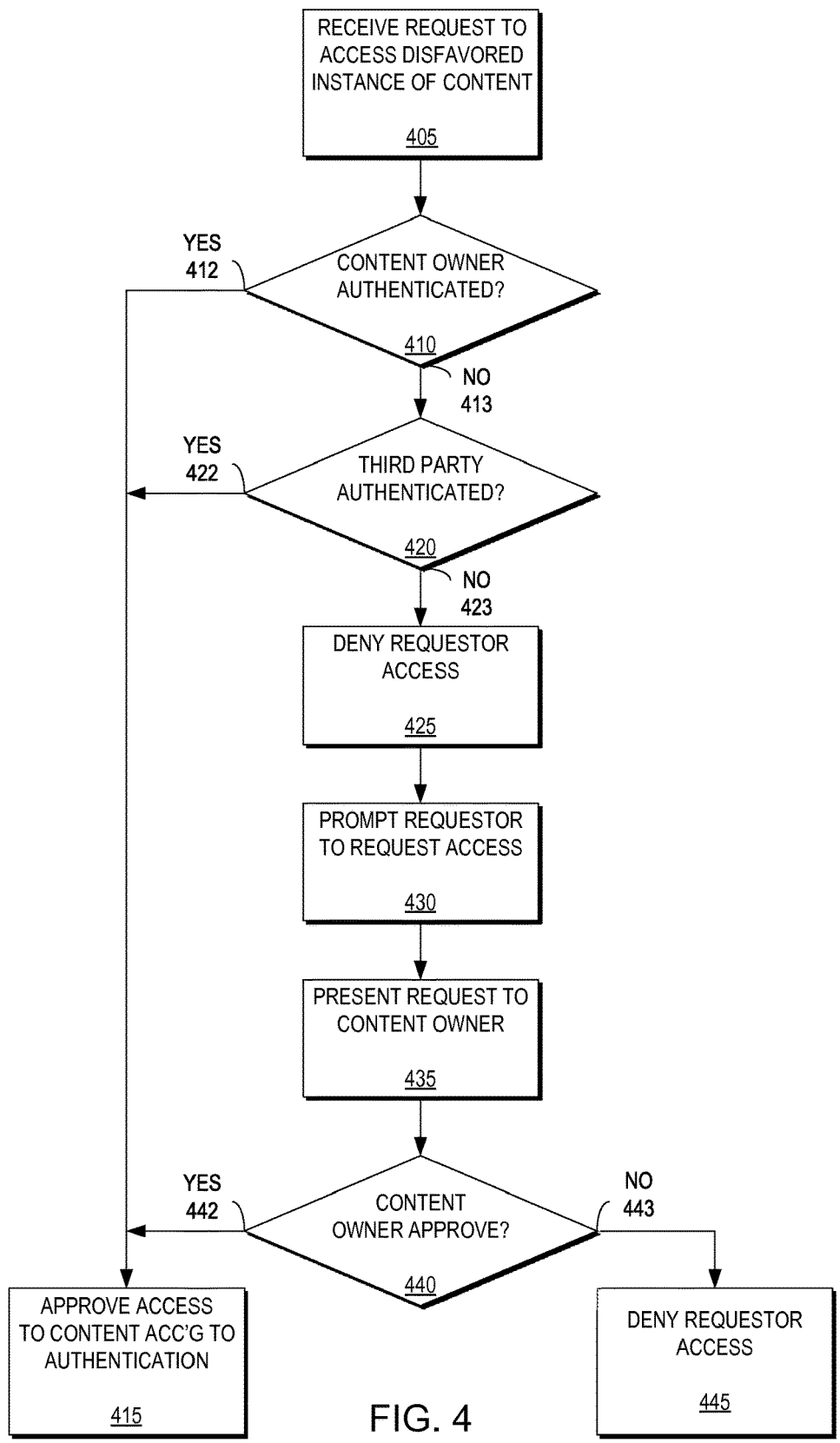

FIG. 4 is a flow diagram illustrating a method for authenticating a request to access a disfavored instance of content according to an example embodiment of the present invention. FIGS. 1 and 4 may be described in conjunction. A requestor of the storage infrastructure 100 (e.g., a search engine) may attempt to access the disfavored instance of the content 150. However, the policy engine 130, the cleanup agent 135, and the HSM system 140 have replaced the disfavored instance of the content 150 with a stub. Therefore, the policy engine 130 may require the requestor authenticate with the policy engine 130 before being granted access to the disfavored instance of the content 150 copied to archive storage 125 in the storage infrastructure 100.

Accordingly, the policy engine 130 may receive a request to access the disfavored instance of the content 150 (405). In certain embodiments, the request may include requestor authentication. The policy engine 130 may determine whether the request is authenticated to be from an owner of the disfavored instance of the content 150 (410) or from another authenticated third party (420). If the request is authenticated to be from an owner of the disfavored instance of the content 150 (412), the policy engine 130 may approve access to the disfavored instance of the content 150 with a first level of access for the owner (415).

However, if the request is not authenticated to be from the owner of the disfavored instance of the content 150 (413), the policy engine 130 may determine whether the request is authenticated to be from another authenticated third party (420). If the request is authenticated to be from another authenticated third party (422), the policy engine 130 may approve access to the disfavored instance of the content 150 with a second level of access for the authenticated third party (415).

For example, a third party may be provided authentication credentials for access to the content 150 by default. Similarly, for example, if a regulatory body must have access to the information (e.g., by law), the requestor (e.g., a government search engine) may be automatically granted access to the content 150 without requiring special permission of the owner of the content. For example, a supplier of the policy engine 130 may provide default authentication credentials to the requestor without the involvement or permission of the content owner, for example, to comply with regulatory requirements. In other embodiments, the policy engine may identify the requestor via, for example, an Internet protocol (IP) address of the requestor.

However, if the request is not authenticated to be from another authenticated third party (423), the policy engine 130 may deny the requestor access to the disfavored instance of the content 150 (425). In certain embodiments, the policy engine 130 then may inform the requestor that the content exists and prompt the requestor to request access to the disfavored instance of the content 150 (430). In turn, the policy engine 130 may present the request to the content owner for approval (435). The content owner then may approve or deny the requestor access (440). If the content owner approves the requestor's request for access to the disfavored instance of the content 150 (442), the policy engine 130 may approve the requestor's access to the disfavored instance of the content 150 for a level of access consistent with or according to the level of authentication (415). However, if the content owner denies the requestor's request for access to the disfavored instance of the content 150 (443), the policy engine may deny the requestor's access to the disfavored instance of the content 150 (445).

Figure 5:
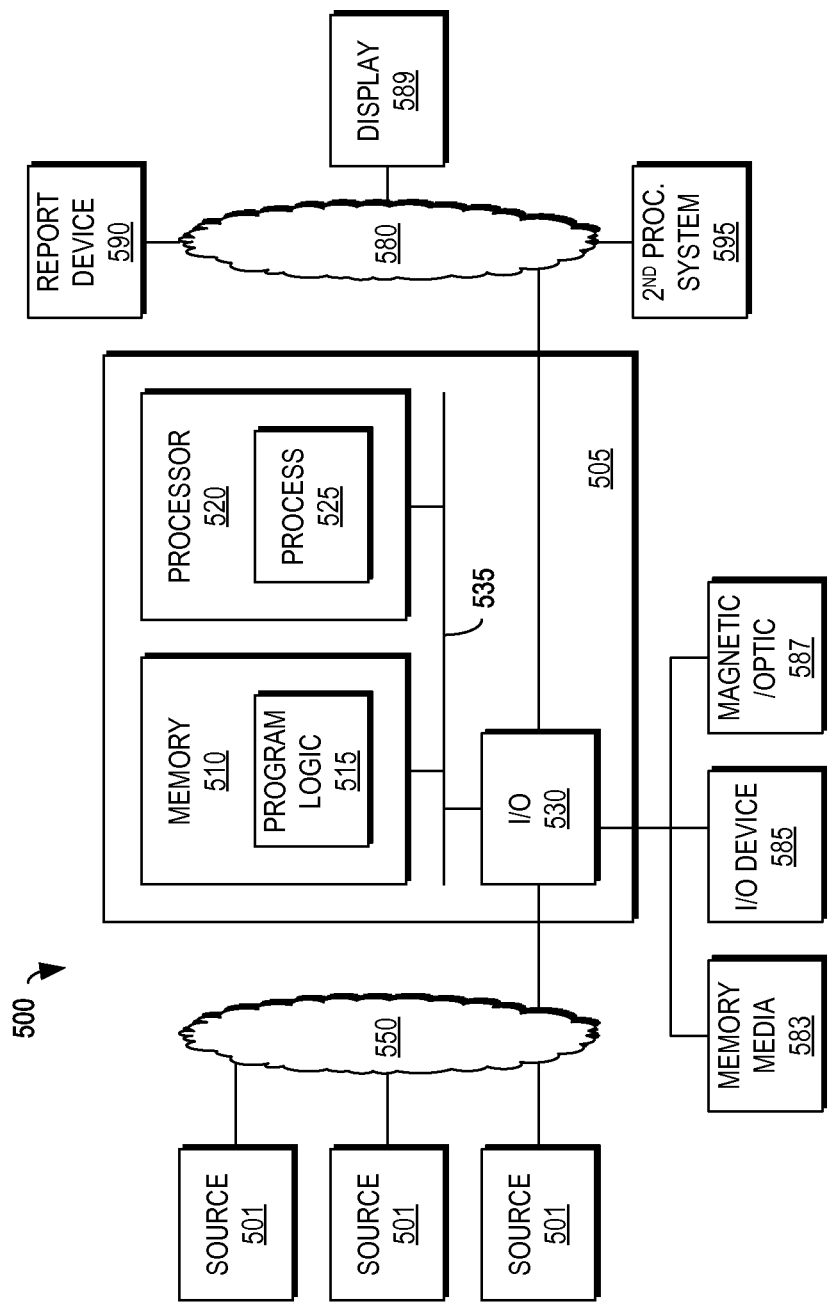
FIG. 5 is a block diagram of an apparatus according to an example embodiment of the present invention.

FIG. 5 is a block diagram of an example embodiment apparatus 505 according to the present invention. The apparatus 505 may be part of a system 500 and includes memory 510 storing program logic 515, a processor 520 for executing a process 525, and a communications I/O interface 530, connected via a bus 535. The communications I/O interface 530 provides connectivity to memory media 583, I/O device 585, and drives 587, such as magnetic or optical drives. The apparatus 505 is configured to communicate with a plurality of sources 501 via a network 550 using the communications I/O interface 530. The apparatus 505 is further configured to communication with a display 589, a report device 590, and a second processing system 595 via a network 580 using the communications I/O interface 530.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 6:
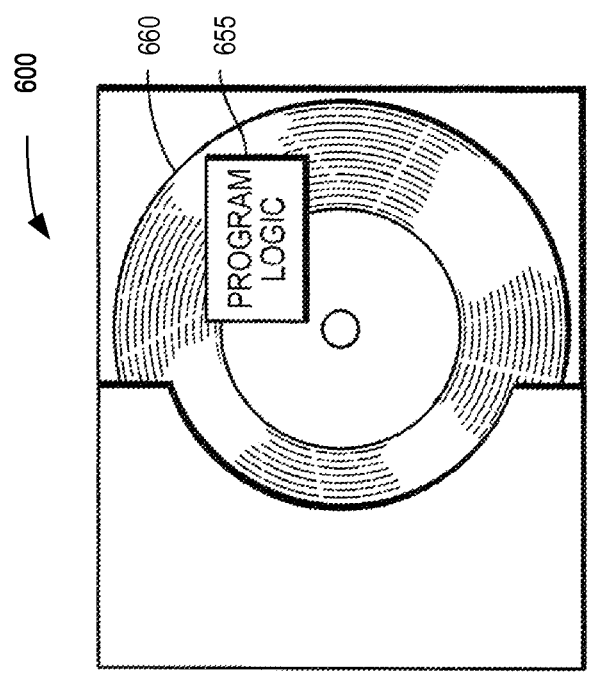
FIG. 6 is a block diagram of an example embodiment of the present invention embodied in computer program code.

FIG. 6 is a block diagram of a computer program product 600 including program logic 655, encoded on a computer-readable medium 660 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
scanning a storage infrastructure for content having an attribute, the storage infrastructure comprising a first storage resource associated with a search engine and at least a second storage resource not associated with the search engine;
identifying a primary instance of the content having the attribute;
identifying a disfavored instance of the content having the attribute in the first storage resource;
the primary instance of the content comprising updated information relative to the disfavored instance of the content;
the disfavored instance of the content comprising at least one of outdated, incorrect and privacy-risking information;
removing the disfavored instance of the content from circulation in favor of the primary instance, wherein removing the disfavored instance of the content from circulation comprises:
copying the disfavored instance of the content from the first storage resource to the second storage resource;
replacing the disfavored instance of the content in the first storage resource with a stub;
configuring the stub to link to a location of the disfavored instance of the content stored in the second storage resource, wherein the search engine is not configured with access to the second storage resource; and
provisioning the stub with metadata comprising one or more keywords describing one or more characteristics of the disfavored instance of content to enable the search engine to index the disfavored instance of the content without accessing the second storage resource; and
controlling access to the disfavored instance of the content identified by the stub and stored in the second storage resource by determining an identity of a requestor requesting access to the disfavored instance of the content, selecting one of a plurality of authentication types based at least in part on the identity of the requestor, and requesting authentication utilizing the selected authentication type before granting access by the requestor to the disfavored instance of the content copied to the second storage resource;
wherein the method is performed by at least one processing device comprising a processor coupled to a memory.

2. The method of claim 1 wherein the storage infrastructure includes a hierarchical storage management (HSM) system.

3. The method of claim 2 wherein the second storage resource comprises archive storage in the storage infrastructure, and wherein removing the disfavored instance of the content from circulation in favor of the primary instance comprises:
copying the disfavored instance of the content to the archive storage in the storage infrastructure; and
replacing the disfavored instance of the content in the HSM system with the stub identifying the disfavored instance of the content copied to the archive storage in the storage infrastructure.

4. The method of claim 3 the plurality of authentication types comprise authentication of a first type and authentication of at least a second type.

5. The method of claim 4 wherein authentication of the first type enables the HSM system to allow access to the disfavored instance of the content copied to the archive storage in the storage infrastructure to an owner of the disfavored instance of the content.

6. The method of claim 5 wherein authentication of the second type enables the HSM system to allow access to the disfavored instance of the content copied to archive storage in the storage infrastructure to a third party.

7. The method of claim 6 wherein authentication of the second type enabling third party access to the disfavored instance of the content copied to the archive storage in the storage infrastructure enables compliance of the storage infrastructure with third party obligations.

8. The method of claim 4 wherein responsive to unsuccessful authentication of the requestor, the method further comprising:
denying the requestor access to the disfavored instance of the content copied to the archive storage in the storage infrastructure;
prompting the requestor to request access to the disfavored instance of the content copied to the archive storage in the storage infrastructure from an owner of the disfavored instance of the content; and querying the owner of the disfavored instance of the content to approve the request from the requestor for access to the disfavored instance of the content copied to the archive storage in the storage infrastructure; and permitting access by the requestor to the disfavored instance of the content copied to the archive storage in the storage infrastructure according to the approval of the owner of the disfavored instance of the content.

9. The method of claim 1 wherein removing the disfavored instance of the content from circulation in favor of the primary instance comprises deleting at least one additional disfavored instance of the content from a third storage resource in the storage infrastructure.

10. The method of claim 1 wherein:
the storage infrastructure is in a first network; and
identifying the disfavored instance of the content having the attribute comprises searching a second network for the disfavored instance of the content having the attribute.

11. An apparatus comprising:
a processor; and
memory storing computer program code that when executed on the processor causes the apparatus to perform the operations of:
scanning a storage infrastructure for content having an attribute, the storage infrastructure comprising a first storage resource associated with a search engine and at least a second storage resource not associated with the search engine;
identifying a primary instance of the content having the attribute;
identifying a disfavored instance of the content having the attribute in the first storage resource;
the primary instance of the content comprising updated information relative to the disfavored instance of the content;
the disfavored instance of the content comprising at least one of outdated, incorrect and privacy-risking information;
removing the disfavored instance of the content from circulation in favor of the primary instance, wherein removing the disfavored instance of the content from circulation comprises:
copying the disfavored instance of the content from the first storage resource to the second storage resource; and
replacing the disfavored instance of the content in the first storage resource with a stub;
configuring the stub to link to a location of the disfavored instance of the content stored in the second storage resource, wherein access to the second storage resource is controlled by an owner of the disfavored instance of the content; and
provisioning the stub with metadata comprising one or more keywords describing one or more characteristics of the disfavored instance of content to enable the search engine to index the disfavored instance of the content without accessing the second storage resource; and
controlling access to the disfavored instance of the content identified by the stub and stored in the second storage resource by determining an identity of a requestor requesting access to the disfavored instance of the content, selecting one of a plurality of authentication types based at least in part on the identity of the requestor, and requesting authentication utilizing the selected authentication type before granting access by the requestor to the disfavored instance of the content copied to the second storage resource.

12. The apparatus of claim 11 wherein the storage infrastructure includes a hierarchical storage management (HSM) system.

13. The apparatus of claim 12 wherein the second storage resource comprises archive storage in the storage infrastructure, and wherein removing the disfavored instance of the content from circulation in favor of the primary instance comprises:
copying the disfavored instance of the content to the archive storage in the storage infrastructure; and
replacing the disfavored instance of the content in the HSM system with the stub identifying the disfavored instance of the content copied to the archive storage in the storage infrastructure.

14. The apparatus of claim 13 wherein the plurality of authentication types comprise authentication of a first type and authentication of at least a second type.

15. The apparatus of claim 14 wherein authentication of the first type enables the HSM system to allow access to the disfavored instance of the content copied to the archive storage in the storage infrastructure to an owner of the disfavored instance of the content.

16. The apparatus of claim 15 wherein authentication of the second type enables the HSM system to allow access to the disfavored instance of the content copied to the archive storage in the storage infrastructure to a third party.

17. The apparatus of claim 16 wherein authentication of the second type enabling third party access to the disfavored instance of the content copied to the archive storage in the storage infrastructure enables compliance of the storage infrastructure with third party obligations.

18. The apparatus of claim 14 wherein responsive to unsuccessful authentication of the requestor, the apparatus is further configured to perform the operations of:
denying the requestor access to the disfavored instance of the content copied to the archive storage in the storage infrastructure;
prompting the requestor to request access to the disfavored instance of the content copied to the archive storage in the storage infrastructure from an owner of the disfavored instance of the content; and
querying the owner of the disfavored instance of the content to approve the request from the requestor for access to the disfavored instance of the content copied to the archive storage in the storage infrastructure; and
permitting access by the requestor to the disfavored instance of the content copied to the archive storage in the storage infrastructure according to the approval of the owner of the disfavored instance of the content.

19. The apparatus of claim 11 wherein removing the disfavored instance of the content from circulation in favor of the primary instance comprises deleting at least one additional disfavored instance of the content from a third storage resource in the storage infrastructure.

20. The apparatus of claim 11 wherein:
the storage infrastructure is in a first network; and
identifying the disfavored instance of the content having the attribute comprises searching a second network for the disfavored instance of the content having the attribute.

21. A computer program product having a non-transitory computer readable storage medium having computer program code encoded thereon comprising:
- computer program code for scanning a storage infrastructure for content having an attribute, the storage infrastructure comprising a first storage resource associated with a search engine and at least a second storage resource not associated with the search engine;
- computer program code for identifying a primary instance of the content having the attribute;
- computer program code for identifying a disfavored instance of the content having the attribute in the first storage resource;
- the primary instance of the content comprising updated information relative to the disfavored instance of the content;
- the disfavored instance of the content comprising at least one of outdated, incorrect and privacy-risking information;
- computer program code for removing the disfavored instance of the content from circulation in favor of the primary instance, wherein removing the disfavored instance of the content from circulation comprises:
  - copying the disfavored instance of the content from the first storage resource to the second storage resource;
  - replacing the disfavored instance of the content in the first storage resource with a stub;
  - configuring the stub to link to a location of the disfavored instance of the content stored in the second storage resource, wherein access to the second storage resource is controlled by an owner of the disfavored instance of the content; and
  - provisioning the stub with metadata comprising one or more keywords describing one or more characteristics of the disfavored instance of content to enable the search engine to index the disfavored instance of the content without accessing the second storage resource; and
- computer program code for controlling access to the disfavored instance of the content identified by the stub and stored in the second storage resource by determining an identity of a requestor requesting access to the disfavored instance of the content, selecting one of a plurality of authentication types based at least in part on the identity of the requestor, and requesting authentication utilizing the selected authentication type before granting access by the requestor to the disfavored instance of the content copied to the second storage resource.

* * * * *